Figure 1:
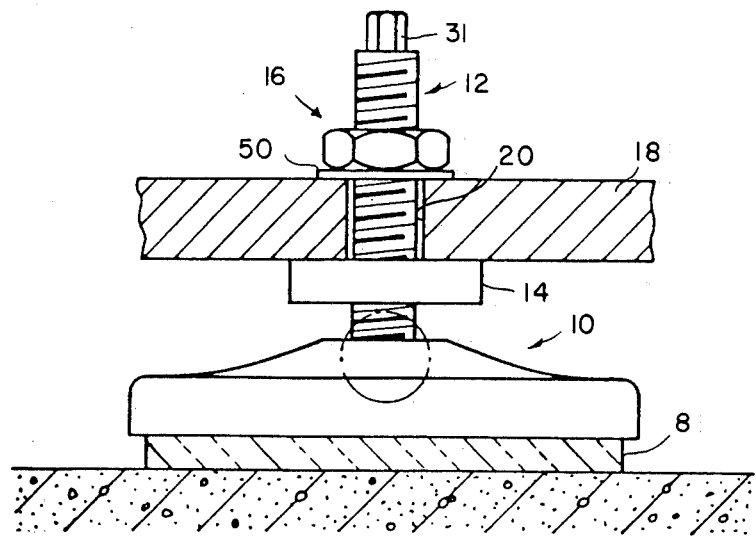

United States Patent

Schrepfer

[11] Patent Number: 4,576,357
[45] Date of Patent: Mar. 18, 1986

[54] LEVELING ELEMENT

[76] Inventor: Rudolf Schrepfer, Eigenheimstr. 22, Küsnacht/ZH, Switzerland, 8700

[21] Appl. No.: 550,489

[22] Filed: Nov. 9, 1983

[30] Foreign Application Priority Data

Feb. 7, 1983 [CH] Switzerland .......................... 685/83

[51] Int. Cl.⁴ .............................................. F16M 3/00
[52] U.S. Cl. ................. 248/662; 248/188.2; 248/615; 248/667
[58] Field of Search ............... 248/662, 656, 650, 660, 248/663, 667, 516, 527, 615, 616, 677, 188.8, 188.9, 188.2, 188.3, 188.4, 900, 316.7, 316.8, 354.7; 403/24, 25, 76, 122, 143; 312/256

[56] References Cited

U.S. PATENT DOCUMENTS

| | | | |
|---|---|---|---|
| 1,711,085 | 4/1929 | D'Arcy | 248/616 |
| 2,606,048 | 8/1952 | Jones | 403/24 |
| 2,944,367 | 7/1960 | Bontecue | 248/188.3 |
| 3,353,771 | 11/1967 | Bow | 248/662 |
| 3,602,465 | 8/1971 | Velut | 248/616 |
| 3,889,915 | 6/1975 | Hashiguchi et al. | 248/900 |
| 4,368,864 | 1/1983 | Tobey | 248/615 |

Primary Examiner—Ramon S. Britts
Assistant Examiner—Ramon O. Ramirez
Attorney, Agent, or Firm—Charles E. Pfund

[57] ABSTRACT

A leveling element comprising a post, a support plate containing an opening defining a seat for receiving an end of the post, bearing means at said end of the post structured to be received in said opening in engagement with the seat for angular movement of the support plate relative to the longitudinal axis of the post and yieldable retaining means incorporated in the opening yieldably displaceable to permit the bearing means at the end of the post to be moved into the opening into engagement with the seat and to retain the support plate at said end of the post.

9 Claims, 2 Drawing Figures

LEVELING ELEMENT

BACKGROUND OF THE INVENTION

This invention pertains to a leveling element for leveling machinery and the like, comprising a threaded post and a base plate of the kind wherein the threaded post is pivotally supported at one end in a seat provided in the base plate for angular movement relative to the base plate.

To install a leveling element or elements of this kind, it is necessary to tilt or lift the machine from the floor, screw the threaded post into the base of the machine and then lower the machine while holding the base plate in a position beneath it to engage the lower end of the threaded post with the recess in the base plate. This is an exceedingly hazardous operation and can result in serious bodily injury to the person or persons installing the machine. Furthermore, since the base plate is not permanently connected to the post whenever the machine is moved, the leveling operation must be repeated. Very often, the base plate becomes misplaced or lost which requires replacement and reinstallation which is both time-consuming and a nuisance. A further disadvantage of this kind of leveling element resides in the fact that a large inventory of parts must be kept on hand since, for threaded posts of different diameters, a corresponding number of supporting plates must be provided.

The purpose of this invention is to eliminate the above disadvantages by providing a leveling element wherein the support plate can be permanently attached to the threaded post after the threaded post is installed on the base of the machine to be supported thereby so that when the machine is to be installed, the base plate need not be held or guided into position, but will be lowered into supporting position by lowering of the machine to a position to bring the base plate into engagement with the supporting floor. A further purpose is to provide leveling elements wherein a common support plate can be used with posts of different diameter to thus reduce the inventory of parts.

SUMMARY OF THE INVENTION

The leveling element as herein illustrated comprises a post, a support plate containing an opening defining a seat for receiving an end of a post, means at said end of the post structured to be received by the seat for angular movement of the support plate relative to the longitudinal axis of the post, retaining means incorporated in the support plate extending into the opening, yieldably displaceable in one direction to permit said end of the post to enter the opening into engagement with the seat and resistant to displacement in the opposite direction to prevent displacement of the support plate from said end of the post. The means at the end of the post is a bearing member having a convex end surface and the seat has a conical surface within which the convex end surface of the bearing member is engaged when seated. The resilient retaining means is in the form of a ring concentric with the seat embodying an annular flange, disposed at an oblique angle to the axis of the post defining an opening of smaller diameter than the bearing member and the recess adjacent the end of the post is an annular groove within which the edge of the annular flange extends. The opening defined by the annular flange is of sufficiently larger diameter than the annular groove to permit angular movement of the post relative to the seat. The post is exteriorly threaded and there is means for attaching the post to the base of the machine to be supported thereby, comprising a threaded carrying nut threaded onto the post for engagement with the underside of the base above the support plate and a nut threaded onto the post above the base for securing the post to the base of the machine to be supported.

Figure 2:
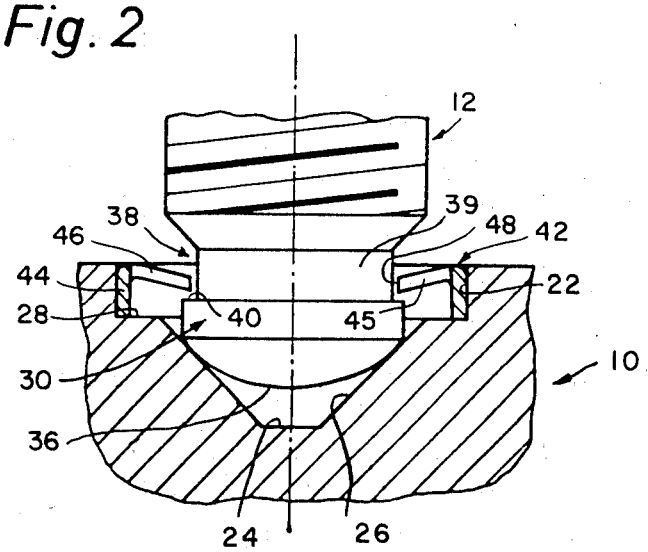

The invention will now be described in greater detail with reference to the accompanying drawings, wherein:

FIG. 1 is an elevation of the leveling element of this invention fastened to the base of a machine to be supported showing a portion of the base in section with the supporting plate resting on a cushion which, in turn, rests on the floor or other supporting structure wherein the machine is installed; and FIG. 2 is an enlarged fragmentary view showing the lower part of the post in elevation and the supporting plate and yieldable retaining means in section.

Referring to the drawings, the leveling element of this invention comprises essentially a support plate 10, a post 12, the lower end of which is structured to be received by the supporting plate 10 and means for fastening the leveling element to the base of a machine to be supported and leveled thereby, comprising a carrying nut 14 for engagement with the underside of the base of the machine and a securing nut 16 for engagement with the upper side of the base of the machine to fix the leveling element to the base of the machine. As herein shown, a fragmentary portion of the base of the machine is shown at 18 containing an opening 20 for receiving the post.

In accordance with the invention, the support plate 10 is of circular configuration and has in its upper side a circular opening 22 at the bottom of which there is a concentric truncated conical recess 24 having a downwardly-converging side wall 26. At the junction of the opening 22 with the conical recess 24, there is an annular shoulder 28.

The post 12 has at its lower end a foot 30 of circular cross section of somewhat smaller diameter than the diameter of the upper end of the conical recess and a spherical end surface 36 defining a bearing element for tangential engagement with the side wall 26 of the conical recess 24 below the open upper end of the conical recess. Rearwardly of the foot 30, that is, at the side opposite the spherical end surface 36, there is an annular groove 38 which defines with the foot a reduced portion 39 of smaller diameter than the foot and an annular shoulder 40. The post is provided at its upper end with a hexagonal end portion 31.

The foot 30 of the post is retained in the conical recess 24 with its spherical end surface 36 seated in tangential engagement with the conical surface of the conical recess 24 by means of retaining means in the form of a ring 42 having a cylindrical part 44 dimensioned to be received within the circular opening 22 and a radial flange 46 defining a circular opening 48 of somewhat smaller diameter than the foot 30, but of somewhat larger diameter than the diameter of the reduced portion 39 of the post. The resilient ring 42 is fixed within the circular opening 22 so that the flange 46 is concentric with the axis of the conical recess in the support and extends into the groove 38. The annular flahge 46 is disposed at an oblique angle to the axis of the conical recess 24 and contains peripherally-spaced, radially-disposed slots 45. The flange 46 rigidly resists lateral displacement of the bearing relative to its seat while permitting angular movement relative thereto, is flexibly displaceable in a direction to increase the diameter of the opening 48 and in the opposite direction to decrease the diameter of the opening 48.

To install the leveling device for use, the post 12 is first inserted through the hole 20 in the machine frame 18, whereupon the carrying nut 14 is positioned on the post at the desired level, that is, at the level it is desired to have the machine frame supported above the floor, whereupon the securing nut 16 is threaded onto the post above the machine frame against a washer 50 to fix the post to the base of the machine. Now, while the machine is in a conveniently raised position, the support plate 20 is forced onto the foot 30 at the lower end of the post by pressing it against the spherical end surface 36 of the foot 30 so as to deflect the flange 46 sufficiently to admit the foot and to allow the flange 46 to spring back behind the shoulder 40 into the groove 38 behind the foot, thus coupling the supporting plate to the lower end of the post. Now, the machine can be lowered without having to position or guide the support plate into its supporting position. Having once attached the supporting plate to the lower end of the post, the machine can be moved, whenever desired, without loss of the supporting plate and leveled without reinstallation of the leveling elements. A vibration isolating pad 8 may be used between the bottom side of the support plate and the floor.

As pointed out, the opening 48 in the flange 46 is sufficiently larger than the reduced portion 38 of the post to enable tilting the support plate relative to the post enough to accommodate any irregularity in the surface upon which the machine is installed which would usually be encounted. However, it is sufficiently smaller in diameter than the shoulder 40 to prevent the foot from being disengaged from the plate.

As herein illustrated, the foot of the post is dimensioned to be coupled to a support plate of predetermined size independently of the diameter of the post in order to reduce the inventory of parts required.

It should be understood that the present disclosure is for the purpose of illustration only and includes all modifications or improvements which fall within the scope of the appended claims.

What is claimed is:

1. A leveling element comprising a post, a support plate containing an opening defining a seat for receiving the end of the post, bearing means at said end of the post structured to be received in said opening in tangential engagement with the seat, retaining means embodying a flexibly yieldable flange defining an opening bounded by an annular edge centered with respect to said bearing opening and of a smaller diameter than said opening, spaced from the place of tangency of the bearing means with the seat, said flange being rigidly resistant to lateral displacement of the bearing means relative to the seat while permitting angular movement of the bearing means relative to the seat and being resiliently yieldable in a direction toward the seat to expand the opening defined by said edge to a diameter larger than said bearing means to admit the bearing means through the opening therein into tangential engagement with the seat and limitedly yieldable in the opposite direction to contract the opening to a diameter smaller than the diameter of the bearing means to prevent withdrawal of the bearing means through said opening and, hence, disengagement of the bearing means from the seat.

2. A leveling element according to claim 1 wherein there is an annular recess circumferentially of the post within which said edge of the flange is received.

3. A leveling element according to claim 1 wherein the retaining means is recessed into an opening in the support plate in concentric relation to the seat and wherein the bearing means defines a radial shoulder of larger diameter than the unexpanded opening in the retaining means.

4. A leveling element according to claim 1 wherein said flange contains peripherally-spaced, radially-disposed slots.

5. A leveling element according to claim 1 wherein the bearing means is defined by a convex end surface and the seat is defined by a conical surface with which the convex surface of the bearing means is engaged.

6. A leveling element according to claim 1 wherein the post is externally threaded and there is means mounted on the post for securing it to the base of the machine to which it is to be attached.

7. A leveling element comprising a post, a support plate containing an opening defining a seat for receiving an end of the post, bearing means at said end of the post structured to be received in said opening in engagement with the seat for angular movement of the support plate relative to the longitudinal axis of the post and yieldable retaining means incorporated in the opening yieldably displaceable to permit the bearing means at the end of the post to be moved into the opening into engagement with the seat and to retain the support plate at said end of the post wherein the post contains an annular groove and the retaining means comprises a ring recessed into the opening in the support plate in concentric relation to the seat provided with a radial flange which extends into the groove inclined toward the bearing means at an oblique angle to the axis of the post.

8. A leveling element according to claim 7 wherein the annular flange contains peripherally-spaced radial slits.

9. A leveling element according to claim 7 wherein the inner edge of the flange is of smaller diameter than the bearing means, but of larger diameter than the groove.

* * * * *

UNITED STATES PATENT AND TRADEMARK OFFICE
CERTIFICATE OF CORRECTION

PATENT NO. : 4,576,357
DATED      : March 18, 1986
INVENTOR(S) : Rudolph Schrepfer It is certified that error appears in the above-identified patent and that said Letters Patent is hereby corrected as shown below:

In the Legend:

Insert -- [73] Assignee: Rudolph Schrepfer AG
                         Eigenheimstrasse, Switzerland --

Signed and Sealed this

Twenty-sixth Day of August 1986

[SEAL]

Attest:

DONALD J. QUIGG

*Attesting Officer*   *Commissioner of Patents and Trademarks*